Patented Dec. 5, 1944

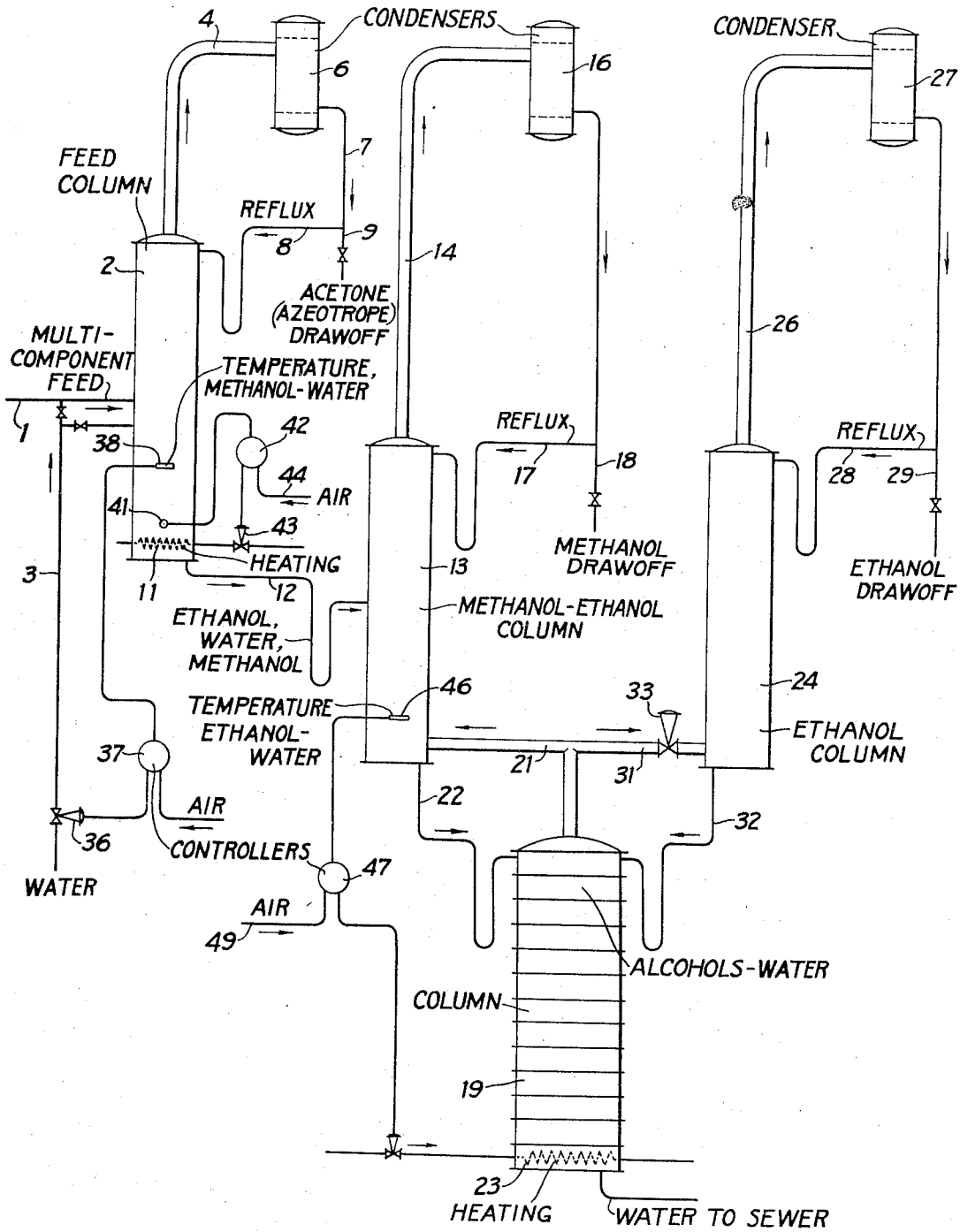

2,364,341

UNITED STATES PATENT OFFICE 2,364,341

DISTILLATION CONTROL

Albert G. Bright and Webster E. Fisher, Rochester, N. Y., assignors to Eastman Kodak Company, Rochester, N. Y., a corporation of New Jersey Application April 24, 1941, Serial No. 390,146

4 Claims. (Cl. 202—42)

This invention relates to a process and apparatus for controlling distillation processes and more particularly to improved procedure for the automatic control of distillation processes for separating mixtures comprised of several different components.

The control of distillation processes for separating simple mixtures, as for example binary mixtures, is not too difficult. That is, with simple mixtures, as a binary mixture comprised of a high boiling compound and a low boiling compound, the temperature recordations can generally be considered representative of the changes in the mixture. The temperature in the upper part of the distillation column would be affected by the lower boiling component, whereas the temperature at the lower part of the column would be affected by the higher boiling component. If the temperature in the unit increased this would be an indication of an increase in the content of the higher boiling component and on the other hand, if the temperature dropped, this would indicate an increase in the lower boiling component. It is apparent, therefore, that in simple systems temperature recordations may be considered quite satisfactory for control and do not involve undue complications.

However, in many of the present industrial methods there are encountered quite complex mixtures for which prior art procedure and apparatus arrangement for control are unsatisfactory. For example, in a four-component solvent mixture, an increase or decrease in a high and low boiling component might produce the same temperature effect as respects lowering or increasing the temperature within the distilling unit as an increase or decrease in the intermediate boiling component of the multicomponent mixture. It is, therefore, apparent that a separation of multicomponent mixtures with at least partial automatic control presents a somewhat complicated problem, particularly as respects the ability to automatically control such separation procedure with either existing control equipment or relatively simple automatic controllers. In view of the fact that in industry various multicomponent mixtures may be obtained, particularly solvent mixtures, from which it is necessary to recover the components in at least a partially separated state before their reuse, the development of methods and arrangements of equipment for accomplishing at least partial automatic control is a highly desirable result.

We have found new procedure and arrangement of apparatus for carrying out this procedure whereby relatively complex multicomponent mixtures may be distilled in the distillation set-up and the distillation controlled to a substantial extent automatically, thereby permitting a relatively continuous and extended operation.

This invention has for one object to provide a new method for the automatic control of separation of multicomponent mixtures. Still another object is to provide a control procedure applicable to multicomponent mixtures but only involving relatively simple control mechanism. A still further object is to provide an improved method particularly adapted to the separation of solvent mixtures, as for example, solvent mixtures containing a plurality of high- and low-boiling point alcohols, ketones, water, and the like. Still another object is to provide an arrangement of apparatus for carrying out the foregoing method steps. Other objects will appear hereinafter.

In commercial operations from which various solvent mixtures are obtained and which must be separated, while the mixtures may be described as of an average composition, in fact the composition fluctuates. That is, while a component of a mixture might be described as comprising 30% therein, actually at various times this component might even be as low as 20% or 25% or as high as 35%. Hence, for satisfactory separation of such commercial mixtures control is necessary due to the fact that under such practical conditions the composition of the feed is certain to vary.

Therefore, in the distillation of multicomponent mixtures, as industrial solvent mixtures, where there are several components each of which may vary, it can be seen from the foregoing that standard controls are susceptible of certain limitations.

We have found, however, that the situation can be handled, as it were, by dividing the control of the separation process. That is, control may be applied to the mixture to be separated in several ways. Control may be applied to certain of the components of the mixture to render the content of such components constant. With this being accomplished it follows that any variations occurring in temperature of the mixture must be due to the components not being rendered constant. Therefore, when we further process a mixture wherein certain components have been rendered constant, automatic control, even though based upon relatively simple temperature-responsive devices, may be depended upon for setting heating valves, withdrawal valves, and the like inasmuch as the temperature recordations can be correlated with definite changes in the mixture undergoing distillation.

For a further understanding of our invention reference is made to the attached drawing, forming a part of the present application. The attached drawing shows a semi-diagrammatic side elevation view of one apparatus which might be employed for carrying out our invention.

Referring to the drawing, 1 is the feed conduit for supplying the mixture to be separated to the preliminary feed column 2. Either attached to the feed conduit or to another part of the column is another conduit 3 for supplying one of the components, which it is desired to render constant, to the mixture.

The column, as may all of the columns described in our apparatus arrangement, may be of bubble cap construction or other similar construction. The upper portion of the column is provided with a vapor offtake conduit 4 which leads through condenser 6 to the several conduits 7, 8, and 9, conduit 8 being for the return of reflux to the column, and conduit 9 is for the purpose of withdrawing a portion of the condensate which condensate may be treated, for example, in accordance with the process described in our copending application 269,193.

The lower portion of the column is provided with a heating unit 11 which may comprise a closed or open steam coil or other type of heating arrangement. The lower part of the column is also provided with a drawoff conduit 12 which also constitutes the feed conduit to the second column 13.

Column 13 is substantially similar to column 2 and comprises a vapor offtake conduit 14, a condenser 16, and withdrawal lines 17 and 18.

However, in the instance of column 13 the lower portion thereof is connected with a heating and exhausting column 19 from which the vapors pass to column 13 through conduit 21, the liquid being returned through conduit 22.

This column 19, which is provided with suitable heating means, as for example the steam coil 23, serves the dual function of also being the source of heat for column 24. This latter column, as in the instance of the other columns, may include vapor offtake conduit 26, condenser 27, reflux line 28, and withdrawal line 29. The lower part of the column is provided with a vapor feed conduit 31 and a liquid return conduit 32. Valve means as at 33 may be provided for controlling the proportion of vapors which it is desired to supply to either column 13 or 24.

Referring now to the feature of automatic control, in connection with column 2 and in particular conduit 3, which as indicated may feed either directly into the column or into the feed line, there is provided a control valve 36. This valve is connected through controller 37 which in turn is in connection with a thermosensitive element 38 positioned at an intermediate point in column 2. The actuation mechanism 37 may be caused to operate by air pressure, electrically or otherwise, air being indicated in the present instance as merely an illustrative means of actuating the device. That is, as the temperature affects the thermosensitive element 38 this disturbance is transmitted to the controller 37 where air pressure (or other medium or electrically) is introduced, which either causes the opening or closing of valve 36, depending upon the nature of the disturbance recorded by the thermosensitive element 38.

Column 2 is likewise provided with another element 41 sensitive to the conditions within the column which in turn is connected to the controller 42. This controller is connected to valve 43 and air supply 44 or other medium, for causing the actuation of the controller. As will be discussed hereinafter, preferably for example, element 41 would be a pressure-responsive device.

In connection with column 13, there is provided a thermosensitive element 46 positioned intermediate of the column, which element is connected through controller 47 to valve 48 actuated by air or other medium supplied through 49.

There may be various automatic valves connected with reflux and withdrawal lines 8, 9, 17, 18, 28, and 29, whereby the quantity of liquid withdrawn in proportion to the quantity returned as reflux may be automatically controlled. Such control devices are described in detail in our copending application 269,193, hence, a description here is unnecessary inasmuch as with respect to the present process the various liquids withdrawn as distillates may be either manually or automatically divided as respects reflux and withdrawal. However, in my preferred operation we would employ automatic controls at all points, but as will be discussed hereinafter, the present invention contemplates either partial or complete automatic control.

The functioning of our apparatus is apparent to some extent from the legends appearing on the drawing.

Assuming that a solvent mixture was to be separated comprising acetone (B. P. 56° C.), methanol (B. P. 64° C.), ethanol (B. P. 78° C.), and water (B. P. 100° C.), the boiling range thereof would depend on the proportions of the various components. An increase in the methanol component or other low-boiling component therein (at the expense of a higher boiling component) would of course tend to lower the boiling point of the entire mixture. On the other hand, an increase in a higher boiling component such as the ethanol (at the expense of a low boiling component) would tend to increase the boiling point. If a high boiling component increased at the same time as a low boiling point component increased, the net result might be that the boiling point of the composition would not change. Therefore, it is apparent that the mere boiling point of the mixture would not necessarily indicate the state of the composition. However, we have found that in such multicomponent mixtures if, for example, the acetone and water components were rendered constant or standard, then it necessarily follows that any temperature changes thereafter would be an indication of changes in the ethanol and methanol components. That is, (assuming certain components have been rendered constant or standard) an increase in temperature indicated on the thermosensitive element would indicate an increase in the content of ethyl alcohol relative to the content of methanol. On the other hand, a decrease in temperature would indicate an increase in the methanol component, with reference to the ethanol, inasmuch as the methanol being a lower boiling component and being present in an increased quantity would tend to reduce the boiling point of the entire mixture.

It is, therefore, apparent from the foregoing that by applying our novel control steps it is possible to cause the temperature indications to be representative of changes which may be occurring in the multicomponent mixture. Since mere temperature changes, and in some instances pressure changes are employed, automatic control can be accomplished with considerable simplicity even in processing liquid mixtures containing several different ingredients.

Referring now to the controlling, the following example of our invention is set forth for illustrating one embodiment of our preferred procedure, it being understood that this example is set forth for the purposes of illustration and our invention is not to be unduly restricted thereby.

The multicomponent mixture to be separated comprised acetone, methanol, ethanol, and water. This mixture was fed through conduit 1 into distillation column 2. Heat was supplied in heating means 11 actuated by the pressure controller 41. A pressure controller is preferred at this low point in the column because of the fact that the composition of the feed may vary and the temperature at such a low point, for the reasons already discussed, may not represent a criterion of the conditions at that point. By using a pressure controller sufficient heat can be employed to maintain the pressure constant at that point substantially irrespective of the mixture composition at that position. At the top of the column, through conduit 4, a constant boiling mixture containing 85% acetone and 15% alcohol was volatilized off through condenser 6 and the condensate divided, a portion being returned through conduit 8 as reflux, the remainder being withdrawn through conduit 9 to further treatment as in accordance with procedure set forth in our application 269,193 or our Patent 2,179,991.

In this particular example there was also introduced through feed conduit 1 a content of water supplied through 3. The function of this content of water, as is apparent from the preceding description, is to render one of the variables constant. The amount of water supplied through conduit 3 is controlled by valve 36 which functions in response to the thermosensitive element 38 positioned intermediate of the column. We have found that at a point intermediate of the column the temperature there may be considered that of the alcohol (and principally methanol)-water composition, and amounts of acetone at this point would not have an appreciable effect upon this temperature. Therefore, the temperature at this intermediate point is usually determined by the proportion of alcohol to the water and may, therefore, be used as a criterion of the alcohol-water ratio and the controller 37 permitted to operate accordingly. This control regulates the water supply so that the ratio of water to the other components at this point is substantially constant. Hence, the water content as a variable which would effect the process at later stages is removed from consideration by this step of automatic control. The acetone, as we have pointed out, has been removed from the head of the column as an azeotrope and, therefore, reduced to the fixed or standard amount, zero.

The components from column 2 from which the acetone has been distilled and in which the water content has been rendered constant are removed through conduit 12 to column 13. In column 13 the mixture undergoes further distillation and vapors essentially comprising methanol are volatilized through conduit 14, condensed in condenser 16, a portion of the condensate being returned as reflux through conduit 17, and the remainder being withdrawn through conduit 18. A portion of the vapor fed from the base heater or heating column 19, rather than passing through conduit 21 to column 13, passes through conduit 31 to heat column 24, which column serves to remove ethyl alcohol.

In this column the vaporized ethyl alcohol passing through conduit 26 is condensed in condenser 27 and a portion withdrawn at 29; another portion may be returned through conduit 28 for reflux.

The heat supply to the base of unit 19 and thereafter to columns 13 and 24, is controlled by temperature controller 47 which operates the diaphragm valve 48. Controller 47 is actuated by the temperature-responsive device positioned near the base of column 13 as at 46. It is the function of this control 46 to so control the temperature at this point that no substantial amount of methyl alcohol (except that which might be desired as as denaturant) be allowed to reach the bottom of column 13.

Since at 46 there is, in this particular example under consideration, a mixture of methyl alcohol, ethyl alcohol, and water, temperature alone would not be a criterion of the methyl alcohol concentration unless the other factor, such as the concentration of water, were fixed. Since, however, we have fixed the amount of water reaching column 13 relative to the amount of methyl alcohol, the temperature recorded at 46 is a measure of the relative amounts of methyl alcohol and ethyl alcohol present in the lower part of the column and, hence, may be used as a basis of control of 47. The temperature would be preferably maintained at a value that only relatively pure ethyl alcohol, free from any great amounts of methanol, would flow through conduit 22. As indicated above, it may be desirable that a certain amount of methyl alcohol be permitted to be present in the ethanol as a denaturant. The exact temperature which would be recorded at point 56 would depend upon the particular plate upon which the thermosensitive element was positioned and other factors, such as the amount of methanol which it is desired to permit to pass to the lower part of the unit. In general, however, the temperature would be substantially above 64° C., thereby permitting the obtaining of relatively pure ethanol.

The ethanol and water passing through conduit 22 into the column 19 is re-vaporized, a portion, as already indicated, being permitted to flow through conduit 31 into column 24 where water is rectified therefrom and the ethanol constant-boiling mixture distilled off through 26 and recovered as previously indicated. The amount of vapors (which if desired may contain larger amounts of methanol than that used as a denaturant if temperature device 46 is operated low) permitted to pass into column 24 may be controlled by valve 33 which, if desired, may be caused to operate either from the temperature or pressure within column 24.

It can be seen from the foregoing, therefore, that we have provided a method and apparatus arrangement whereby multicomponent mixtures may be separated by distillation and the distillation controlled to a substantial extent automatically by relatively simple thermosensitive or pressure-sensitive controllers. As pointed out, in general in treating such a multicomponent mixture having components of various boiling points, we would first render one or more components constant or standardized, thereby resolving the mixture into a mixture which would thereafter function somewhat the same as a simple binary mixture. That is, certain of the components being constant we would then know that any changes in temperature recorded by the thermosensitive elements must be due to one or the other of the components, depending upon the magnitude and direction of the temperature change. For example, a recordation of the drop in a temperature of 46 would indicate that a quantity of methanol (low boiling component), reaching the thermosensitive element was substantial and consequently the controller 47 would be actuated, introducing more steam so that the methanol would be volatilized to the upper portion, leaving the column through conduit 14. On the other hand, the setting of thermosensitive element 46 would be such that the temperature would not increase to too great an extent, so that the ethanol would be volatilized to the top of the column.

The various controllers 37 to 47 may be direct action, open and shut, throttling or advance action, or may be controllers with a certain amount of delayed action and resetting. That is, in the latter instance, a temperature change indicated by the thermosensitive element, while disturbing the controller 47 is not instantaneously transmitted to the valve in connection therewith. The valve, rather than being opened instantaneously the necessary amount, might be caused to be slightly opened over a period of several minutes by the gradual effect of the air supply rather than the instantaneous admission of a quantity of air sufficient to open the valve the necessary amount to admit all the steam for increasing the temperature.

While the foregoing example and description has been set forth with respect to aqueous multicomponent solutions containing alcohols and ketones, our invention may be applied to various other solutions. For example, a multicomponent hydrocarbon type of solution containing xylene, toluene, and benzene, or a mixture of organic acids, could be treated in somewhat comparable manners, one of the higher boiling components being rendered constant by the introduction of a further content thereof in a manner analogous to the water introduction in the above example, and the resultant mixtures processed in the several columns to recover the respective components. Other variations may be made in our process and apparatus set-up. For example, the water introduction through conduit 3 rather than being controlled by a temperature regulator as has been discussed, might be controlled by a specific gravity control substituted at 38.

The present application is a continuation-in-part of our copending application 269,193, filed April 21, 1939, entitled "Separation of solvent mixtures." It is, therefore, apparent from the foregoing that our invention is susceptible of some modification, hence, we do not wish to be restricted excepting insofar as is necessitated by the prior art and the spirit of the appended claims.

What we claim and desire to be secured by Letters Patent of the United States is:

1. A process for separating a mixture containing acetone, methanol, ethanol, and water which comprises substantially continuously feeding the mixture to a distillation unit, also substantially continuously feeding to the distillation unit a content of water, the quantity of water fed being automatically controlled in response to thermal changes at an intermediate point in the distillation to produce a mixture in which the water content is substantially constant in relation to the alcohol, distilling the mixture to remove acetone and methanol as a head product, condensing the distillate and returning a portion thereof as reflux, removing as a residue of this distillation an aqueous mixture of ethanol and methanol wherein the water content has been rendered substantially constant as aforesaid, subjecting this mixture to distillation for recovering methanol as a distillate and ethanol and water as a residue of the distillation, controlling the heat input to this second distillation automatically by control dependent upon thermal changes intermediate of this distillation, subjecting aqueous ethanol residue resulting from this second distillation to a third distillation substantially simultaneously occurring with the second distillation by means of by-passing a portion of the volatilized components to both the second and the third distillation and recovering ethanol as a distillate from the third distillation.

2. A process for separating a mixture containing acetone, two lower aliphatic alcohols, and water which comprises substantially continuously feeding the mixture to a distillation unit, also substantially continuously feeding to the distillation unit a content of water, the quantity of water fed being automatically controlled in direct response to changes at an intermediate point in the distillation to produce a mixture in which the water content is approximately constant in relation to the alcohol, distilling the mixture to remove acetone and one alcohol as a head product, the heat input for this distillation being automatically controlled by the pressure within the unit at a point below said feed, condensing the distillate and returning a portion thereof as reflux, removing as a residue of this distillation an aqueous mixture of the two alcohols wherein the water content is substantially constant, subjecting this mixture to distillation for recovering the lower boiling alcohol as a distillate and the higher boiling alcohol and water as a residue of the distillation, controlling the heat input to this second distillation automatically by control dependent upon thermal changes intermediate of the distillation and subjecting the aqueous alcohol residue of this second distillation to a third distillation.

3. In a process for separating a multi-component variable mixture of distillable liquids comprising at least one low boiling component, a high boiling component and components boiling intermediate the high and low boiling components in which the mixture of the intermediate boiling components function as a simple binary mixture, in a plurality of distilling steps which comprise first continuously distilling off the low boiling portion of the mixture and rendering the high boiling component in substantially constant ratio to the sum of the intermediate boiling components, additions of the high boiling component being automatically controlled in response to any variation of temperature in said distillation at a point therein substantially free of the low boiling component, subjecting the residue from said first distillation step to further distillation wherein a distillate comprising the lower boiling of the intermediate boiling components is removed, and the higher boiling components of the mass are obtained as a residue of the distillation, the heat supplied to this latter distillation being automatically controlled in proportion to temperature variations in said distillation at a point therein below that at which the residue of the first distillation enters the second distillation.

4. A process for separating a multi-component variable mixture of distillable liquids containing at least one low boiling component, water and two water-soluble components boiling intermediate the boiling points of water and the low boiling components, which comprises substantially continuously feeding the mixture to a distillation unit, also substantially continuously feeding to the distillation unit a content of water, the quantity of water fed being automatically controlled in direct response to temperature changes in the distillation at a point therein substantially free of the low boiling components to produce a mixture in which the water content is substantially constant in relation to the sum of the two intermediate boiling components, distilling the mixture to remove the low boiling component, removing as a residue of this distillation an aqueous mixture of said two intermediate boiling components, wherein the water content is in substantially constant ratio to the intermediate boiling components, subjecting this mixture to distillation for recovering the lower boiling of the intermediate boiling components as a distillate, and the higher boiling of the intermediate boiling components and water as a residue of the distillation, and controlling the heat input to this second distillation automatically by control dependent upon thermal changes in said distillation at a point below that at which the residue of the first distillation enters the second distillation.

ALBERT G. BRIGHT.
WEBSTER E. FISHER.